(No Model.)
W. H. CHAPMAN.
Gag Runner for Harness.
No. 234,246. Patented Nov. 9, 1880.
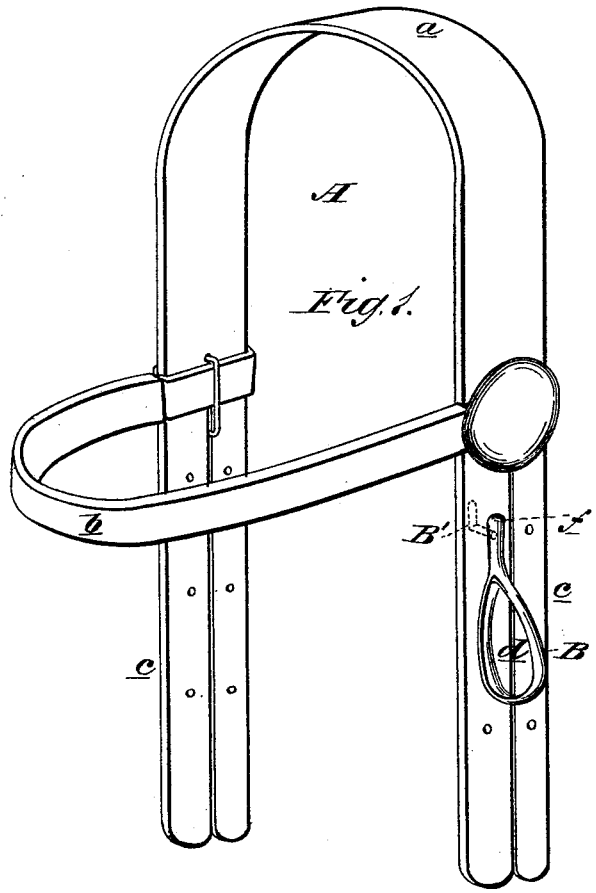
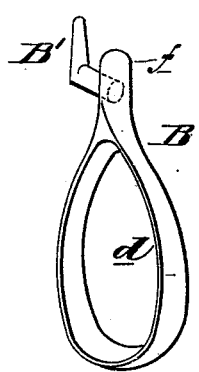
WITNESSES:
Francis McArdle
C. Sedgwick
INVENTOR:
W. H. Chapman
BY Munn & Co
ATTORNEYS.

UNITED STATES PATENT OFFICE.

WILLIAM H. CHAPMAN, OF MIDDLETOWN, CONNECTICUT.

GAG-RUNNER FOR HARNESS.

SPECIFICATION forming part of Letters Patent No. 234,246, dated November 9, 1880.

Application filed September 21, 1880. (No model.)

*To all whom it may concern:*

Be it known that I, WILLIAM H. CHAPMAN, of Middletown, in the county of Middlesex and State of Connecticut, have invented a new and Improved Gag-Runner for Harness, of which the following is a specification.

The object of this invention is to provide a gag-runner that can more easily be secured to broad straps.

The invention consists of an elbow-stud projecting at right angles from near the tip of the gag-runner loop, and having its free end extended above the said loop-tip.

Figure 1 is a perspective view of a portion of a head-stall with the improved gag-runner secured in place. Fig. 2 is a perspective view of the gag-runner.

Similar letters of reference indicate corresponding parts.

Gag-runners are ordinarily provided with a button or a hook whereby they are attached to the head-stall of a horse for supporting the check-rein. To attach those provided with a button it is necessary to make an elongated cut or slit in the harness-strap for the entrance of the button, whereby the said strap is weakened, and said slit or cut becoming stretched or distorted after a little wear, presents an unsightly appearance. These objections are remedied by the use of a hook, but the hooked gag-runner cannot be engaged in the center of a broad stout strap—like the crown-strap of a head-stall—or in a broad throat-latch, unless the hook be straightened out so that its hold in the strap shall be insecure.

By the device herein shown and described all these objections are avoided.

In the accompanying drawings, A represents a portion of a horse's head-stall, of which $a$ is the crown-strap, $b$ the nose-strap, and $c\ c$ the throat-latch.

B represents the gag-runner, of which $d$ is the loop, provided with an extended point, $f$, to which the elbow-stud $B'$ is rigidly attached at right angles, so that its free end is parallel with the point $f$ and extended beyond it.

This stud $B'$ can be readily entered into a hole in any strap, and as readily into a hole in the center of a broad strap as in one near the edge thereof, or as in a hole in a narrow strap, because the free end of said stud $B'$ projects upward beyond the end of the loop $d$, and consequently the edge of the said loop $d$ cannot, by contact with the strap, prevent the entrance of the stud $B'$ into the hole thereof, whereas, the hook of a hooked gag-runner can only be entered in a narrow strap or in a hole whose distance from the edge of the strap does not exceed the space between the point of the hook and the edge of the loop of the gag-runner.

A downward strain upon a hooked gag-runner causes the end of the hook to press into the strap so as to bend and distort the latter, while with this improved gag-runner a strain upon it does not so affect the strap, as it (the strap) is clasped by the straight faces of the free end of the elbow-stud $B'$ and the point $f$ of the loop.

Having thus described my invention, I claim as new and desire to secure by Letters Patent—

The combination, in a gag-runner, with the loop having point $f$ at the top, of the elbow-stud $B'$, having its outer arm extended upwardly above said point, and nearly or quite parallel thereto, as shown and described, whereby it may be readily entered, no matter what is the width of strap or the distance of the hole from its edge.

WILLIAM HENRY CHAPMAN.

Witnesses:
CHAS. G. R. VINEL,
JOHN E. DENNIS.